(12) United States Patent
Tsirkin

(10) Patent No.: US 12,238,211 B2
(45) Date of Patent: Feb. 25, 2025

(54) PERFORMING DEDUPLICATION BASED ON ENCRYPTED STORAGE BLOCKS GENERATED USING A SECURE ENCLAVE

(71) Applicant: RED HAT, INC., Raleigh, NC (US)

(72) Inventor: Michael Tsirkin, Yokneam (IL)

(73) Assignee: Red Hat, Inc., Raleigh, NC (US)

( * ) Notice: Subject to any disclaimer, the term of this patent is extended or adjusted under 35 U.S.C. 154(b) by 226 days.

(21) Appl. No.: 17/943,350

(22) Filed: Sep. 13, 2022

(65) Prior Publication Data
US 2024/0089099 A1 Mar. 14, 2024

(51) Int. Cl.
*H04L 9/08* (2006.01)
*H04L 9/14* (2006.01)

(52) U.S. Cl.
CPC .............. *H04L 9/0894* (2013.01); *H04L 9/14* (2013.01)

(58) Field of Classification Search
None
See application file for complete search history.

(56) References Cited

U.S. PATENT DOCUMENTS

| | | | |
|---|---|---|---|
| 10,089,024 B2 | 10/2018 | Tsirkin et al. | |
| 10,261,820 B2 | 4/2019 | Tsirkin et al. | |
| 10,509,733 B2 | 12/2019 | Tsirkin et al. | |
| 11,061,711 B2 | 7/2021 | Tsirkin | |
| 11,232,030 B2 | 1/2022 | Tsirkin | |
| 2017/0123710 A1 | 5/2017 | Fisher | |
| 2021/0374253 A1* | 12/2021 | Chen | H04L 9/0897 |
| 2022/0103338 A1* | 3/2022 | Brooker | H04L 9/0631 |
| 2024/0086335 A1* | 3/2024 | Kaufman | G06F 3/0641 |

OTHER PUBLICATIONS

Shaikh et al., "VMDedup: Memory De-duplication in Hypervisor," IEEE Computer Society, 2014 IEEE International Conference on Cloud Engineering, 2014: pp. 379-384.

* cited by examiner

*Primary Examiner* — Brandon Hoffman
(74) *Attorney, Agent, or Firm* — Kilpatrick Townsend & Stockton LLP

(57) ABSTRACT

Deduplication can be performed based on encrypted storage blocks generated by a secure enclave. For example, a secure enclave can generate a first encrypted storage block and a second encrypted storage block using an encryption key. The first encrypted storage block can be an encrypted version of a first storage block and the second encrypted storage block can be an encrypted version of a second storage block. The secure enclave can then provide the first encrypted storage block and the second encrypted storage block to a supervisory program executable on a processor that is separate from the secure enclave. The supervisory program can be configured to initiate deduplication of the first storage block and the second storage block in response to determining that the first encrypted storage block matches the second encrypted storage block.

20 Claims, 5 Drawing Sheets

PERFORMING DEDUPLICATION BASED ON ENCRYPTED STORAGE BLOCKS GENERATED USING A SECURE ENCLAVE

TECHNICAL FIELD

The present disclosure relates generally to deduplication of data on a computer system. More specifically, but not by way of limitation, this disclosure relates to performing deduplication based on encrypted storage blocks generated using a secure enclave.

BACKGROUND

Data deduplication is a process in which duplicate copies of data stored in a storage device are removed to allow more data to be stored in the storage device. Deduplication typically involves comparing storage blocks to one another to identify a match. A storage block can be a memory block that may correspond to a memory page, multiple memory pages, or a portion of a memory page. When a match between two or more storage blocks occurs, one of the storage blocks is retained on the storage device and the redundant storage blocks are replaced with a small reference that points to the maintained storage block. This can free up storage space by significantly reducing the amount of data that is stored in the storage device. Since the same data may be stored hundreds or thousands of times in the storage device, deduplicating the data can greatly increase the amount of available storage space and improve the utilization of storage resources.

DETAILED DESCRIPTION

Figure 1:
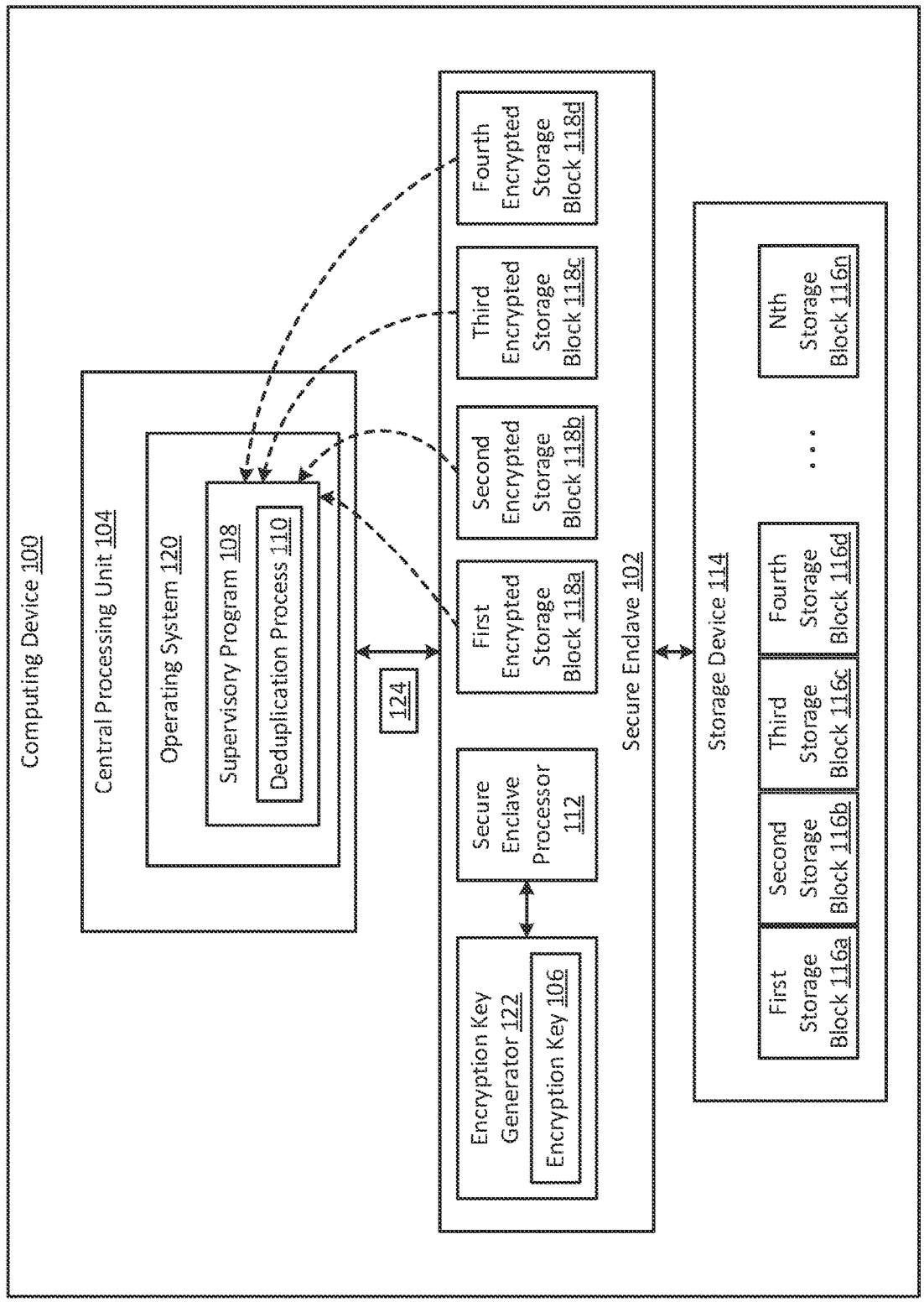
FIG. 1 shows a block diagram of an example of a computing device for performing deduplication according to some aspects of the present disclosure.

Computer systems often include supervisory programs configured to perform deduplication on data stored in a storage device, such as a volatile storage device or a non-volatile storage device. A supervisory program is a software component that is usually part of the operating system (e.g., the kernel) and can control the execution of various routines; regulate work scheduling, input/output operations, error actions, and similar functions; and regulate the flow of work in a data processing system. To perform deduplication, the supervisory program can access the storage device and compare the storage blocks therein to identify matches. While this may be acceptable in situations where the stored data does not contain sensitive information, in other situations in which the stored data contains sensitive information it may be undesirable for the supervisory program to be able to read the data. For example, it may be undesirable for the supervisory program to be able to access sensitive information like biometric data, passwords, or personally identifying information stored in the storage device. In those situations, the computer system may prevent the supervisory program from being able to access the stored data for security reasons. But this can prevent the supervisory program from being able to perform deduplication because, without being able to access the stored data, the supervisory program has no way to perform the required comparisons for deduplication.

Some examples of the present disclosure can overcome one or more of the abovementioned problems by providing a secure enclave that can receive a request for multiple storage blocks from a supervisory program executing on a processor, such as a central processing unit. A secure enclave can be a dedicated secure subsystem that is separate from the processor and that includes electronic circuitry configured to perform security services. In response to receiving the request, the secure enclave can obtain the storage blocks from a storage device, encrypt them using an encryption key to generate encrypted storage blocks, and provide the encrypted storage blocks to the supervisory program. The encryption key can be maintained in the secure enclave and concealed from the supervisory program. The supervisory program can then receive the encrypted storage blocks and perform deduplication based on the encrypted storage blocks. Because the encryption key is hidden from the supervisory program, the supervisory program cannot access the underlying data in the encrypted storage blocks, so the underlying data is kept secure from the supervisory program. And because the encrypted storage blocks are generated using the same encryption key, the encrypted storage blocks will be the same when the underlying data is the same, thereby allowing the supervisory program to still be able to perform deduplication. For example, the supervisory program can determine that multiple encrypted storage blocks match (e.g., that they have the same encrypted content) and therefore infer that their underlying storage blocks also match. So, the supervisory program can execute a deduplication process with respect to the underlying storage blocks.

In some examples, the secure enclave can generate the encryption key used to encrypt the storage blocks. Because the storage blocks are encrypted but not decrypted, the secure enclave may only generate the encryption key without also generating a corresponding decryption key. This may help conserve the computing resources of the secure enclave, because the secure enclave does not need to expend processing power and memory to create a decryption key that it will not use.

Because the encryption key may no longer be needed once the encryption task is complete, in some examples the secure enclave can delete the encryption key from its local memory after using it to encrypt the storage blocks. This may further conserve the limited memory space of the secure enclave. If same storage blocks or other storage blocks are requested by the supervisory program after the encryption key has been deleted, the secure enclave can generate a new encryption key for purposes of encrypting the storage blocks.

In some examples, the secure enclave can periodically (e.g., occasionally) generate a new encryption key. The secure enclave may or may not also delete the old encryption key. For example, the secure enclave can generate a new encryption key, and delete the old encryption key, once per hour. The process of generating a new encryption key and discarding the old encryption key can be referred to as cycling the encryption key. Periodically cycling the encryption key can further enhance the security of the system because it may further protect sensitive information from an attacker. For example, an attacker could control the supervisory program to request a set of storage blocks from the secure enclave at a first point in time. The attacker could also control the supervisory program to request the same set of storage blocks from the secure enclave again at a second point in time. In response to these requests, the secure enclave would provide back a first set of encrypted storage blocks at the first point in time and a second set of encrypted storage blocks at a second point in time. The attacker could then compare the first set of encrypted storage blocks to the second set of encrypted storage blocks. If the first set differs from the second set, and if the secure enclave does not cycle its encryption key as described above, the attacker could infer that the underlying data in the storage blocks has changed. While the attacker would still not be able to access the underlying data, just knowing that it the underlying data has changed may comprise the security of the system. But by cycling the encryption key periodically, the attacker cannot tell whether the first set differs from the second set because the underlying data changed or because the encryption key changed. Thus, periodically cycling the encryption key can further improve the security of the system.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a computing device 100 for performing deduplication according to some aspects of the present disclosure. Examples of the computing device 100 can include a laptop computer, desktop computer, server, tablet, e-reader, a mobile phone, or a wearable device such as a smart watch. The computing device 100 can include a central processing unit 104 executing an operating system 120, such as Red Hat Enterprise Linux® or Microsoft Windows®. The central processing unit 104 may also execute a supervisory program 108. In some examples, the supervisory program 108 may be part of the operating system 120. For example, the supervisory program 108 can be a kernel of a Linux operating system. In other examples, the supervisory program 108 may be separate from the operating system 120 and run on top of, or aside, the operating system 120.

The supervisory program 108 can be configured to perform a deduplication process 110. For example, the supervisory program 108 can be configured to deduplicate data stored in a storage device 114. The deduplication process 110 can involve comparing two or more storage blocks to one another to determine whether they match. Each storage block may correspond to a single memory page, multiple memory pages, or a part of a memory page. If the storage blocks do not match, no deduplication action may be taken. If the storage blocks match, one of the storage blocks can be maintained in the storage device 114 and the redundant storage blocks (e.g., the duplicates) can be deleted from the storage device 114. A page table can then be updated so that the redundant storage blocks point to the maintained storage block.

The storage device 114 can include any suitable type of volatile storage device or non-volatile storage device. For example, the storage device 114 can include a hard disk, a hard drive, optical drive, random access memory (RAM), read-only memory (ROM), or a flash memory. Although the storage device 114 is depicted as being internal to the computing device 100 in FIG. 1, in other examples the storage device 114 may be external to the computing device 100 and communicatively coupled to the computing device 100.

In some examples, the storage device 114 may include data that is to be protected from the supervisory program 108. To assist in protecting the data from the supervisory program 108, the computing device 100 may include a secure enclave 102. The secure enclave 102 is hardware that is separate from the central processing unit 104 and may be dedicated to performing security services. The secure enclave 102 can include a secure enclave processor 112, examples of which may include a Field-Programmable Gate Array (FPGA), an application-specific integrated circuit (ASIC), or a microprocessor. The secure enclave 102 can also include an encryption key generator 122. The encryption key generator 122 can be hardware or software configured to generate encryption keys and optionally decryption keys. In some examples, the encryption key generator 122 may be capable of generating an encryption key 1206 without generating a corresponding description key, which may conserve computing resources. It will be appreciated that although the encryption key generator 122 and the secure enclave processor 112 are shown as separate components in FIG. 1, in other examples the encryption key generator 122 can be software executing on the secure enclave processor 112. Using the encryption key generator 122, the secure enclave 102 can generate an encryption key 106 for use in performing an encryption process that can protect data stored in the storage device 114 from the supervisory program 108.

More specifically, the supervisory program 108 can transmit a request 124 for a first storage block 116a and a second storage block 116b to the secure enclave 102. The supervisory program 108 may transmit the request 124 for the purpose of performing a deduplication process 110 with respect to the first storage block 116a and the second storage block 116b. The secure enclave 102 can receive the request 124. In response to the request 124, the secure enclave 102 can retrieve the storage blocks 116a-b from the storage device 114 and encrypt the storage blocks 116a-b using an encryption key 106 generated by the encryption key generator 122. This can produce a first encrypted storage block 118a and a second encrypted storage block 118b. The first encrypted storage block 118a can be an encrypted version of the first storage block 116a, and the second encrypted storage block 118b can be an encrypted version of the second storage block 116b. The secure enclave 102 can then transmit the first encrypted storage block 118a and the second encrypted storage block 118b to the supervisory program 108. The supervisory program 108 can receive the first encrypted storage block 118a and the second encrypted storage block 118b and perform the deduplication process 110 using the first encrypted storage block 118a and the second encrypted storage block 118b. For example, the supervisory program 108 can compare the first encrypted storage block 118a to the second encrypted storage block 118b to determine whether they match (e.g., they are the same). If not, no deduplication action may be taken. If the first encrypted storage block 118a matches the second encrypted storage block 118b, the supervisory program 108 may then deduplicate the first storage block 116 and second storage block 116b. For example, the supervisory program 108 may maintain the first storage block 116 in the storage device 114 and delete the second storage block 116b from the storage device 114. The supervisory program 118 may also update a page table so that any references to the second storage block 116b point to the memory address of the first storage block 116a. Using these techniques, the storage blocks 116a-b can be deduplicated without the supervisory program 108 being able to access their raw (e.g., plaintext or unencrypted) content.

In some examples, the secure enclave 102 can delete the encryption key 106 subsequent to generating the first encrypted storage block 118a and the second encrypted storage block 118b. This may help conserve memory space in a local memory of the secure enclave 102. And in some examples, the secure enclave 102 can repeatedly change the encryption key over time. For instance, the secure enclave 102 can generate a new encryption key each time the secure enclave 102 detects a predefined event, such as the passage of a predefined time interval or a change to the content of a storage block. The secure enclave 102 may also delete the old encrypting key to conserve memory space. Repeatedly changing the encryption key can improve the security of the system.

The supervisory program 108 and the secure enclave 102 can perform the above process any number of times. For example, at a later point in time, the supervisory program 108 can transmit a request 124 to the secure enclave 102 for a third storage block 116c and a fourth storage block 116d. In response to the request 124, the secure enclave 102 can retrieve the storage blocks 116c-d from the storage device 114 and encrypt the storage blocks 116c-d using the same encryption key 106 or a different encryption key generated by the encryption key generator 122. This can produce a third encrypted storage block 118c and a fourth encrypted storage block 118d. The third encrypted storage block 118c can be an encrypted version of the third storage block 116c, and the fourth encrypted storage block 118d can be an encrypted version of the fourth storage block 116d. The secure enclave 102 can then transmit the third encrypted storage block 118c and the fourth encrypted storage block 118d to the supervisory program 108, which can perform the deduplication process 110 using the third encrypted storage block 118c and the fourth encrypted storage block 118d. For example, the supervisory program 108 can compare the third encrypted storage block 118c to the fourth encrypted storage block 118d, determine that they do not match (e.g., that they are different from one another), and consequently prevent deduplication from being performed with respect to the third storage block 116c and the fourth storage block 116d.

For simplicity, some of the above examples involve performing deduplication with respect to two storage blocks at a time. But, the concepts described herein are not intended to be limited to performing deduplication with respect to only two storage blocks at a time. The supervisory program 108 and the secure enclave 102 can cooperate to perform the above process for any number of storage blocks at a time. For example, the supervisory program 108 and the secure enclave 102 can cooperate to facilitate the deduplication of three, four, or more storage blocks at a time.

Figure 2:
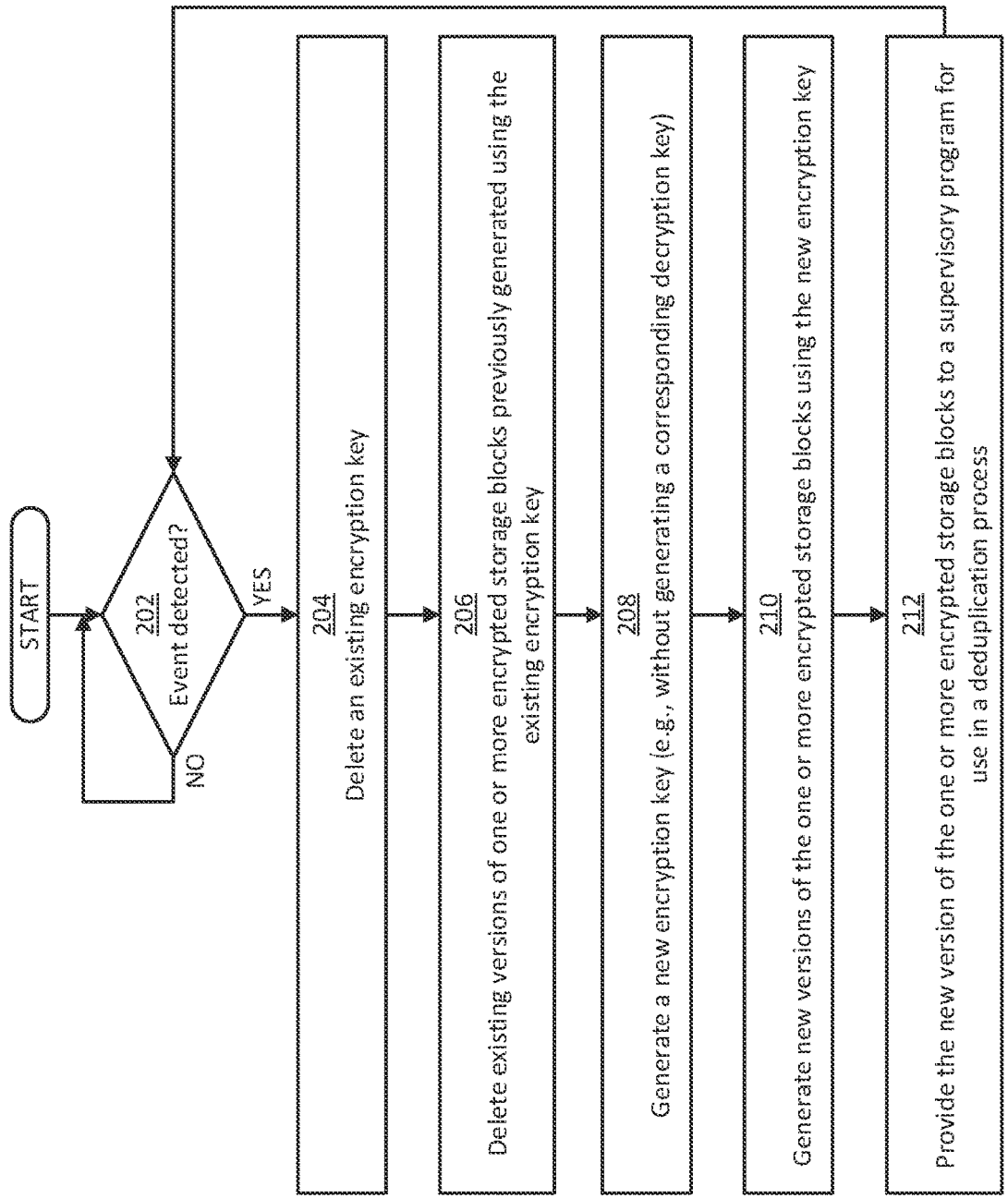
FIG. 2 shows a flow chart of an example of a process performed by a secure enclave according to some aspects of the present disclosure.

FIG. 2 shows a flow chart of an example of a process performed by a secure enclave according to some aspects of the present disclosure. Other examples may include more operations, fewer operations, different operations, or a different order of operations than is shown in FIG. 2. The operations of FIG. 2 are described below with reference to the components of FIG. 1 described above.

In block 202, a secure enclave 102 determines whether an event has been detected. Examples of the event can include the passage of a predetermined time interval (e.g., one hour or one day), a certain type of software or hardware interrupt, or a change in data stored on a storage device 114 associated with the secure enclave 102. If the secure enclave 102 has not detected such an event, the process can return to block 202 and iterate until the event is detected. If the secure enclave 102 detects the event, the process can proceed to block 204.

In block 204, the secure enclave 102 deletes an existing encryption key 106. The existing encryption key 106 may have been generated during a previous iteration of the process. The secure enclave 102 can delete the existing encryption key from a local memory of the secure enclave 102.

In block 206, the secure enclave 102 deletes existing versions of one or more encrypted storage blocks, such as a first encrypted storage block 118a and a second encrypted storage block 118b. The one or more encrypted storage blocks may have been previously generated (e.g., during a previous iteration of the process) using the existing encryption key 106. The secure enclave 102 can delete the existing version of the one or more encrypted storage blocks from a local memory of the secure enclave 102.

In block 208, the secure enclave 102 generates a new encryption key. The secure enclave 102 can generate the new encryption key using the encryption key generator 122. The secure enclave 102 may generate the new encryption key without generating a corresponding decryption key. For example, the encryption process may be an asymmetric encryption process for which an asymmetric key pair is normally be generated that includes a public key for encryption and a private key for decryption. But in some examples, the secure enclave 102 may only generate the public key and not the private key. This may conserve computing resources.

In block 210, the secure enclave 102 generates new versions of the one or more encrypted storage blocks using the new encryption key. For example, the secure enclave 102 can obtain the first storage block 116a from the storage device 114. The secure enclave 102 can then generate a new version of the first encrypted storage block by encrypting the first storage block 116a using the new encryption key. The secure enclave 102 can store the new version of the first encrypted storage block in local memory. Additionally, or alternatively, secure enclave 102 can obtain the second storage block 116b from the storage device 114. The secure enclave 102 can then generate a new version of the second encrypted storage block by encrypting the second storage block 116b using the new encryption key. The secure enclave 102 can store the new version of the second encrypted storage block in local memory.

In block 212, the secure enclave 102 provides the new versions of the one or more encrypted storage blocks to a supervisory program 108 for use in a deduplication process 110. For example, the secure enclave 102 can transmit the new version of the first encrypted storage block to the supervisory program 108. Additionally, or alternatively, the secure enclave 102 can transmit the new version of the second encrypted storage block to the supervisory program 108. The supervisory program 108 may then perform the deduplication process 110 using the new version of the first encrypted storage block and the new version of the second encrypted storage block.

In some examples, the process may then return back to block 202, where the secure enclave 102 again wait for the event. Some or all of this process may repeat each time the secure enclave 102 detects the event.

Figure 3:
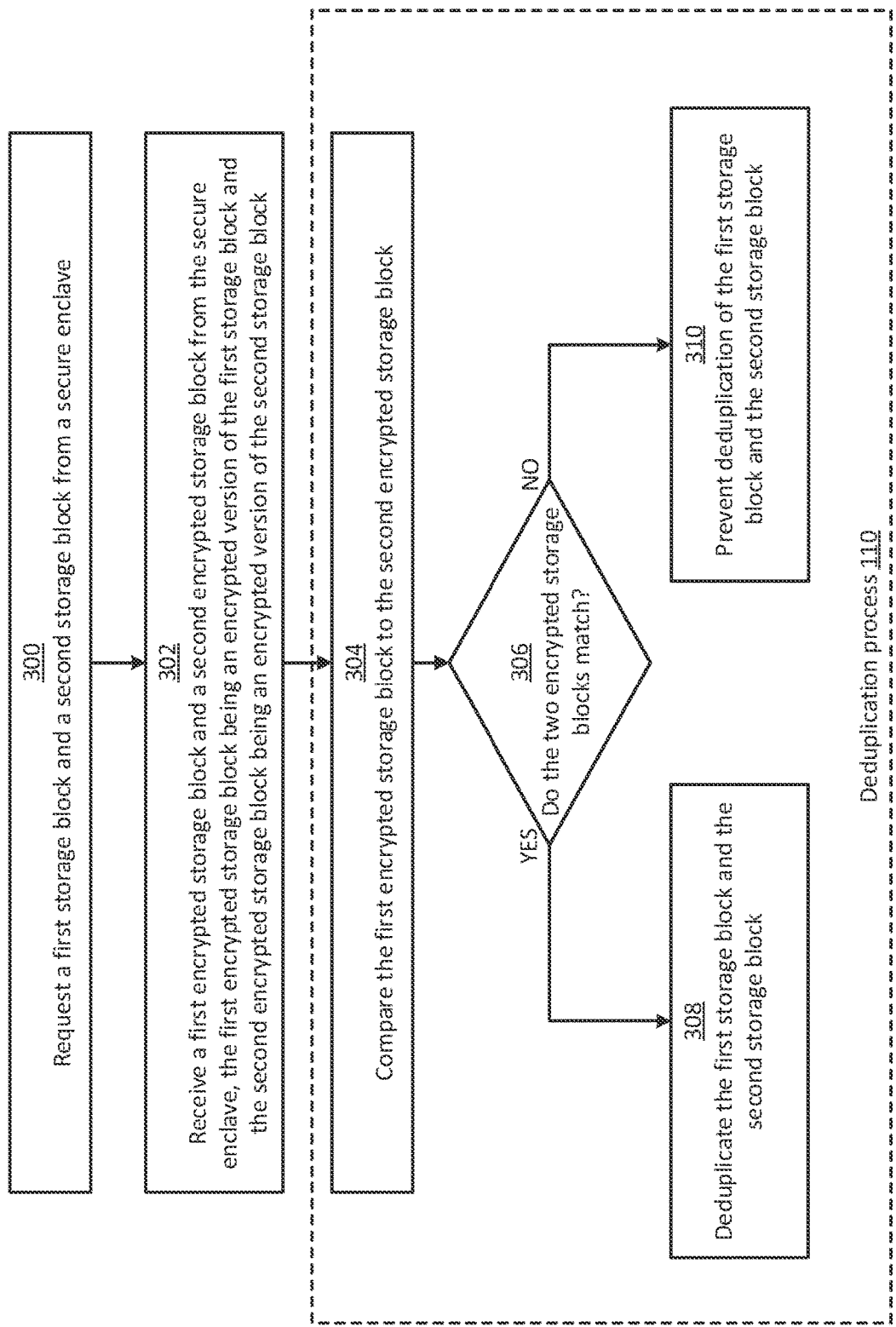
FIG. 3 shows a flow chart of an example of a process performed by a supervisor program according to some aspects of the present disclosure.

FIG. 3 shows a flow chart of an example of a process implemented by a supervisory program according to some aspects of the present disclosure. Other examples may include more operations, fewer operations, different operations, or a different order of operations than is shown in FIG. 3. The operations of FIG. 3 are described below with reference to the components of FIG. 1 described above.

In block 300, a supervisory program 108 requests a first storage block 116*a* and a second storage block 116*b* from a secure enclave 102. For example, the supervisory program 108 can transmit a request 124 for the first storage block 116*a* and the second storage block 116*b* to the secure enclave 102 via a hardware connection, such as a hardware bus.

In block 302, the supervisory program 108 receives a first encrypted storage block 118*a* and a second encrypted storage block 118*b* from the secure enclave 102. The first encrypted storage block 118*a* can be an encrypted version of the first storage block 116*a* and the second encrypted storage block 118*b* can be an encrypted version of the second storage block 116*b*. The supervisory program 108 can be executing on a processor such as a central processing unit 104, which can receive the first encrypted storage block 118*a* and the second encrypted storage block 118*b* from the secure enclave 103 via the hardware connection.

Next, the supervisory program 108 can perform a deduplication process 110 based on the first encrypted storage block 118*a* and the second encrypted storage block 118*b*. More specifically, in block 304, the supervisory program 108 compares the first encrypted storage block 118*a* to the second encrypted storage block 118*b* to determine whether they match. The first encrypted storage block 118*a* and the second encrypted storage block 118*b* may match if the underlying first storage block 116*a* and second storage block 116*b* are duplicates of one another and they are encrypted using the same encryption key 106.

In block 306, the supervisory program 108 determines if the first encrypted storage block 118*a* matches the second encrypted storage block 118*b*. If so, the process can proceed to block 308, where the supervisory program 108 can deduplicate the first storage block 116*a* and the second storage block 116*b*. If the first encrypted storage block 118*a* does not match the second encrypted storage block 118*b*, the process can proceed to block 310, where the supervisory program 108 can prevent deduplication of the first storage block 116*a* and the second storage block 116*b*.

Figure 4:
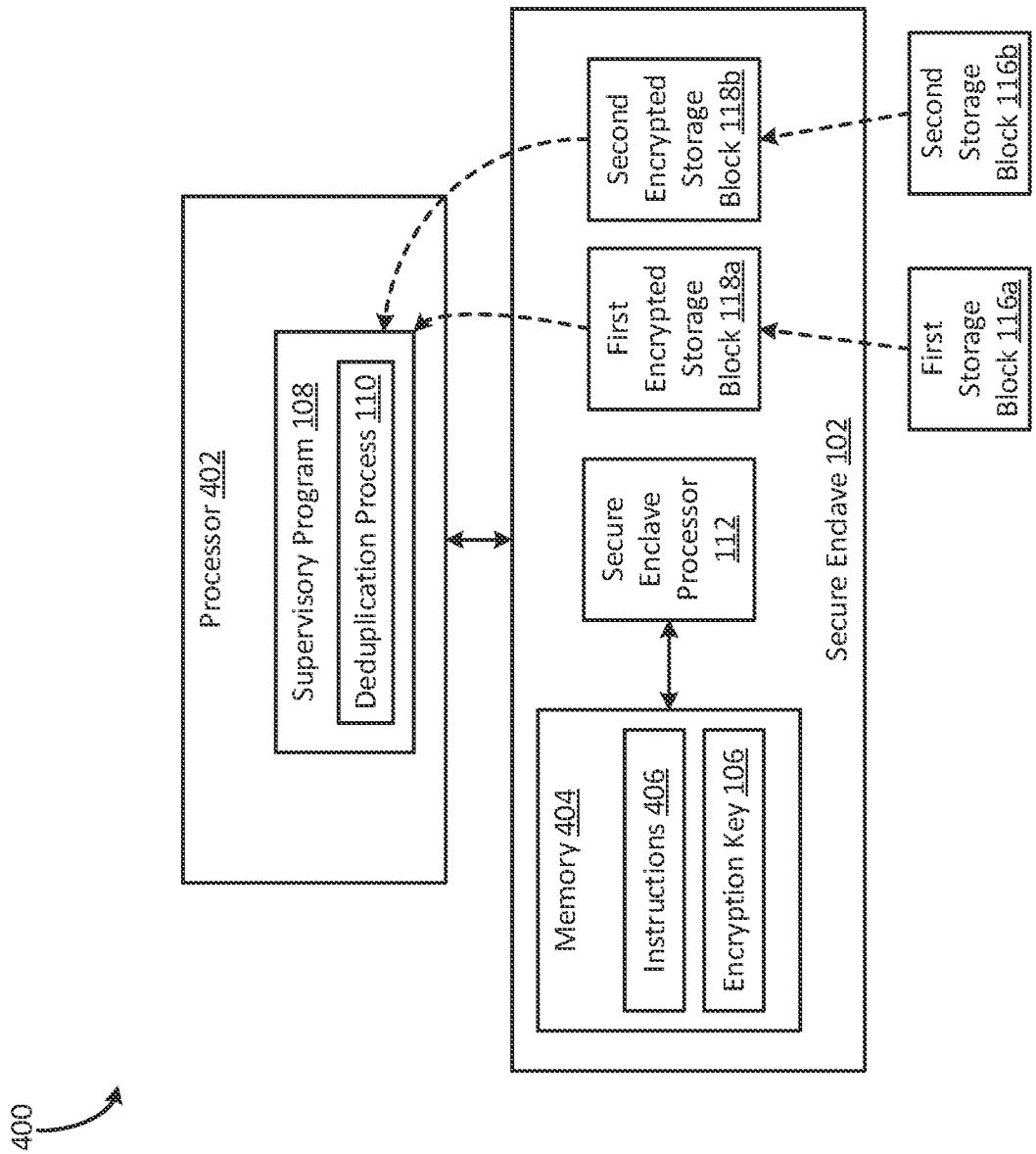
FIG. 4 shows a block diagram of an example of a system for performing deduplication based on encrypted storage blocks generated using a secure enclave according to some aspects of the present disclosure.

FIG. 4 shows a block diagram of an example of a system 400 for performing deduplication based on encrypted storage blocks generated using a secure enclave according to some aspects of the present disclosure. The system 400 includes a processor 402 communicatively coupled to a secure enclave 102. In some examples, the processor 402 may include a central processing unit of a computing device.

The processor 402 can include one processing device or multiple processing devices. Examples of the processor 402 include a Field-Programmable Gate Array (FPGA), an application-specific integrated circuit (ASIC), or a microprocessor. The processor 402 can execute program code stored in a memory to perform operations. In some examples, the program code can correspond to a supervisory program 108 configured to execute a deduplication process 110. The program code can include processor-specific instructions generated by a compiler or an interpreter from code written in any suitable computer-programming language, such as C, C++, C#, Java, or Python.

The secure enclave can include a secure enclave processor 112 communicatively coupled to a memory 404. The secure enclave processor 112 can include one processing device or multiple processing devices. The secure enclave processor 112 can execute program code (e.g., instructions 406) stored in memory 404 to perform operations. The program code can include processor-specific instructions generated by a compiler or an interpreter from code written in any suitable computer-programming language, such as C, C++, C#, Java, or Python.

The memory 404 can include one memory device or multiple memory devices. The memory 404 can be volatile or non-volatile (e.g., it can retain stored information when powered off). Examples of the memory 404 include electrically erasable and programmable read-only memory (EEPROM), flash memory, or any other type of non-volatile memory. At least some of the memory 404 includes a non-transitory computer-readable medium from which the secure enclave processor 112 can read instructions 406. A computer-readable medium can include electronic, optical, magnetic, or other storage devices capable of providing the secure enclave processor 112 with computer-readable instructions or other program code. Examples of a computer-readable medium include magnetic disks, memory chips, ROM, RAM, an ASIC, a configured processor, optical storage, or any other medium from which a computer processor can read the instructions 406.

In some examples, the secure enclave 102 can generate a first encrypted storage block 118*a* and a second encrypted storage block 118*b* using an encryption key 106. For example, the secure enclave processor 112 can use the encryption key 106 to generate the first encrypted storage block 118*a* and the second encrypted storage block 118*b*. The secure enclave processor 112 can then store the first encrypted storage block 118*a* and the second encrypted storage block 118*b* in memory 404. The first encrypted storage block 118*a* can be an encrypted version of a first storage block 116*a*, and the second encrypted storage block 118*b* can be an encrypted version of a second storage block 116*b*. The encryption key 106 can be stored in memory 404 or elsewhere in the secure enclave 102 for use by the secure enclave processor 112 in generating the first encrypted storage block 118*a* and the second encrypted storage block 118*b*.

After generating the first encrypted storage block 118*a* and the second encrypted storage block 118*b*, the secure enclave 102 can provide the first encrypted storage block 118*a* and the second encrypted storage block 118*b* to the supervisory program 108. The supervisory program 108 can be executing on the processor 402 that is separate from the secure enclave 102. The supervisory program 108 can be configured to initiate deduplication of the first storage block 116*a* and the second storage block 116*b* in response to determining that the first encrypted storage block 118*a* matches the second encrypted storage block 118*b*.

Figure 5:
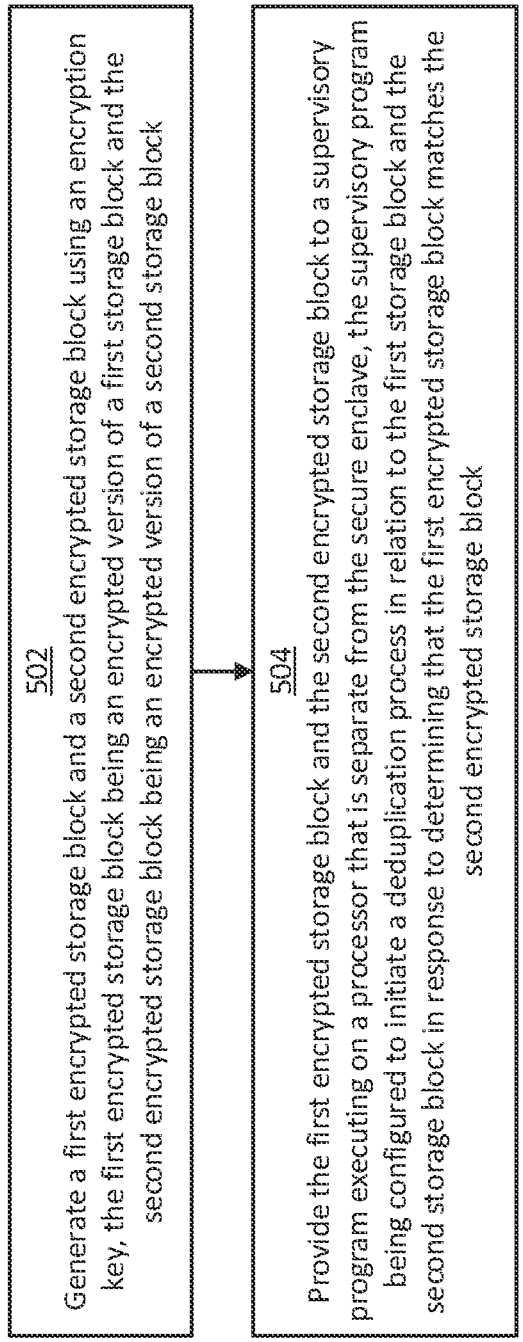
FIG. 5 shows a flowchart of an example of a process for performing deduplication based on encrypted storage blocks generated using a secure enclave according to some aspects of the present disclosure.

FIG. 5 shows a flowchart of an example of a process for performing deduplication based on encrypted storage blocks generated using a secure enclave according to some aspects of the present disclosure. Other examples may include more operations, fewer operations, different operations, or a different order of operations than is shown in FIG. 5. The operations of FIG. 5 are described below with reference to the components of FIG. 4 described above.

In block 502, a secure enclave 102 generates a first encrypted storage block 118a and a second encrypted storage block 118b using an encryption key 106. The first encrypted storage block 118a can be an encrypted version of a first storage block 116a and the second encrypted storage block 118b can be an encrypted version of a second storage block 116b.

In block 504, the secure enclave 102 provides the first encrypted storage block 118a and the second encrypted storage block 118b to a supervisory program 108 executing on the processor 402 that is separate from the secure enclave 102. The supervisory program 108 can be configured to initiate deduplication of the first storage block 116a and the second storage block 116b in response to determining that the first encrypted storage block 118a matches the second encrypted storage block 118b.

While various examples are described above with respect to a supervisory program, it will be appreciated that similar principles can apply to other types of software programs, such as hypervisors. Thus, the concepts described herein are not intended to be limited only to supervisory programs and other types of programs may alternatively be used to perform some or all of the supervisory program's functionality described above.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A method comprising:
generating, by a secure enclave, a first encrypted storage block and a second encrypted storage block using an encryption key, the first encrypted storage block being an encrypted version of a first storage block and the second encrypted storage block being an encrypted version of a second storage block; and
providing, by the secure enclave, the first encrypted storage block and the second encrypted storage block to a supervisory program executing on a processor that is separate from the secure enclave, the supervisory program being configured to initiate deduplication of the first storage block and the second storage block in response to determining that the first encrypted storage block matches the second encrypted storage block.

2. The method of claim 1, wherein the encryption key is maintained in the secure enclave and concealed from the supervisory program.

3. The method of claim 1, further comprising:
generating, by the secure enclave, the encryption key without generating a corresponding decryption key.

4. The method of claim 1, further comprising:
deleting, by the secure enclave, the encryption key subsequent to generating the first encrypted storage block and the second encrypted storage block.

5. The method of claim 1, further comprising the secure enclave repeatedly performing an encryption process, wherein each iteration of the encryption process involves:
generating a new encryption key that is different from an existing encryption key used in a previous iteration of the encryption process; and
encrypting the first storage block and the second storage block using the new encryption key to generate a new version of the first encrypted storage block and a new version of the second encrypted storage block, respectively.

6. The method of claim 1, wherein the first storage block and the second storage block are duplicate memory pages.

7. The method of claim 1, wherein the secure enclave and the processor are parts of the same computing device.

8. The method of claim 1, further comprising:
generating, by the secure enclave, a third encrypted storage block and a fourth encrypted storage block using the encryption key, the third encrypted storage block being an encrypted version of a third storage block and the fourth encrypted storage block being an encrypted version of a fourth storage block;
providing, by the secure enclave, the third encrypted storage block and the fourth encrypted storage block to the supervisory program executing on the processor;
determining, by the supervisory program, that the third encrypted storage block is different from the fourth encrypted storage block; and
in response to determining that the third encrypted storage block is different from the fourth encrypted storage block, preventing, by the supervisory program, deduplication from being performed in relation to the third storage block and the fourth storage block.

9. The method of claim 1, further comprising, prior to generating the first encrypted storage block and the second encrypted storage block using the encryption key:
receiving, by the secure enclave, the first storage block and the second storage block from a storage device that is separate from the secure enclave.

10. A non-transitory computer-readable medium comprising program code that is executable by a secure enclave for causing the secure enclave to:
generate a first encrypted storage block and a second encrypted storage block using an encryption key, the first encrypted storage block being an encrypted version of a first storage block and the second encrypted storage block being an encrypted version of a second storage block; and
provide the first encrypted storage block and the second encrypted storage block to a supervisory program executable on a processor that is separate from the secure enclave, the supervisory program being configured to initiate deduplication of the first storage block and the second storage block in response to determining that the first encrypted storage block matches the second encrypted storage block.

11. The non-transitory computer-readable medium of claim 10, wherein the encryption key is maintained in the secure enclave and concealed from the supervisory program.

12. The non-transitory computer-readable medium of claim 10, further comprising program code that is executable by the secure enclave for causing the secure enclave to:
delete the encryption key subsequent to generating the first encrypted storage block and the second encrypted storage block.

13. The non-transitory computer-readable medium of claim 10, further comprising program code that is executable by the secure enclave for causing the secure enclave to repeatedly perform an encryption process, wherein each iteration of the encryption process involves:
deleting an existing version of the first encrypted storage block and an existing version of the second encrypted storage block;
generating a new encryption key that is different from an existing encryption key used to generate the existing version of the first encrypted storage block and the existing version of the second encrypted storage block;

encrypting the first storage block and the second storage block using the new encryption key to generate a new version of the first encrypted storage block and a new version of the second encrypted storage block, respectively; and providing the new version of the first encrypted storage block and the new version of the second encrypted storage block to the supervisory program for use in a deduplication process.

14. The non-transitory computer-readable medium of claim 10, wherein the first storage block and the second storage block are duplicate memory pages.

15. The non-transitory computer-readable medium of claim 10, wherein the supervisory program is a kernel of an operating system executable by the processor.

16. The non-transitory computer-readable medium of claim 10, wherein the secure enclave is in a first computing device and the processor is in a second computing device that is separate from the first computing device.

17. The non-transitory computer-readable medium of claim 10, further comprising program code that is executable by the secure enclave for causing the secure enclave to:

generate a third encrypted storage block and a fourth encrypted storage block using the encryption key, the third encrypted storage block being an encrypted version of a third storage block and the fourth encrypted storage block being an encrypted version of a fourth storage block; and provide the third encrypted storage block and the fourth encrypted storage block to the supervisory program, the supervisory program being configured to prevent deduplication from being performed in relation to the third storage block and the fourth storage block in response to determining that the third encrypted storage block is different from the fourth encrypted storage block.

18. A system comprising:

a secure enclave including a secure enclave processor; and a memory including instructions that are executable by the secure enclave processor for causing the secure enclave to:

generate a first encrypted storage block and a second encrypted storage block using an encryption key, the first encrypted storage block being an encrypted version of a first storage block and the second encrypted storage block being an encrypted version of a second storage block; and provide the first encrypted storage block and the second encrypted storage block to a supervisory program executable on a processor that is separate from the secure enclave, the supervisory program being configured to initiate deduplication of the first storage block and the second storage block in response to determining that the first encrypted storage block matches the second encrypted storage block.

19. The system of claim 18, wherein the encryption key is maintained in the secure enclave and concealed from the supervisory program.

20. The system of claim 18, wherein the memory further includes instructions that are executable by the processor for causing the secure enclave to repeatedly perform an encryption process, wherein each iteration of the encryption process involves:

deleting an existing encryption key stored in the secure enclave and used in a previous iteration of the encryption process;

deleting an existing version of the first encrypted storage block and an existing version of the second encrypted storage block generated during the previous iteration of the encryption process using the existing encryption key;

generating a new encryption key that is different from the existing encryption key;

encrypting the first storage block and the second storage block using the new encryption key to generate a new version of the first encrypted storage block and a new version of the second encrypted storage block, respectively; and providing the new version of the first encrypted storage block and the new version of the second encrypted storage block to the supervisory program for use in a deduplication process.

* * * * *